US008570851B2

(12) United States Patent
McLeod et al.

(10) Patent No.: US 8,570,851 B2
(45) Date of Patent: Oct. 29, 2013

(54) FFT/IFFT CLOCK ADJUSTMENT

(75) Inventors: Duncan McLeod, Cambridge (GB); Mike Story, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 853 days.

(21) Appl. No.: 12/671,850

(22) PCT Filed: Jul. 24, 2008

(86) PCT No.: PCT/EP2008/059730
§ 371 (c)(1),
(2), (4) Date: Mar. 19, 2010

(87) PCT Pub. No.: WO2009/019139
PCT Pub. Date: Feb. 12, 2009

(65) Prior Publication Data
US 2010/0232395 A1    Sep. 16, 2010

(30) Foreign Application Priority Data
Aug. 8, 2007   (GB) .................................. 0715462.8

(51) Int. Cl.
*H04J 11/00*    (2006.01)
(52) U.S. Cl.
USPC ........... 370/203; 370/343; 370/480; 375/295; 375/316; 455/39; 455/114.1
(58) Field of Classification Search
None
See application file for complete search history.

(56) References Cited

U.S. PATENT DOCUMENTS

| | | | | |
|---|---|---|---|---|
| 5,732,113 | A * | 3/1998 | Schmidl et al. | 375/355 |
| 6,175,550 | B1 * | 1/2001 | van Nee | 370/206 |
| 7,133,646 | B1 | 11/2006 | Miao | |
| 7,305,057 | B1 * | 12/2007 | Miao | 375/350 |
| 7,397,859 | B2 * | 7/2008 | McFarland | 375/260 |
| 2005/0111568 | A1 * | 5/2005 | Adachi | 375/295 |
| 2008/0095273 | A1 * | 4/2008 | Bell et al. | 375/320 |

\* cited by examiner

*Primary Examiner* — Brian Roberts
(74) *Attorney, Agent, or Firm* — Novak Druce Connolly Bove + Quigg LLP; Vincent M DeLuca

(57) ABSTRACT

A receiver for processing a signal in which data symbols are each represented by the energy at each of a plurality of carrier frequencies, the receiver comprising: an analogue to digital converter for periodically sampling the signal and generating a corresponding digital sample; a Fourier transform unit having a plurality of input bins for receiving samples generated by the analogue to digital converter and being arranged to, in dependence on the samples, generate outputs representing the energy in the signal during a sample period at each of a plurality of frequencies including the carrier frequencies; and a symbol estimator for estimating a symbol present in the signal during a sample period in dependence on the outputs of the Fourier transform unit; wherein the number of the input bins is greater than the total number of carrier frequencies and during each sample period the number of the outputs in dependence on which the symbol estimator performs symbol estimation is less than the number of input bins.

19 Claims, 2 Drawing Sheets

FFT/IFFT CLOCK ADJUSTMENT

This invention relates to the design and operation of FFT (fast Fourier transform) and IFFT (inverse fast Fourier transform) equipment, and especially but not exclusively to such equipment that is configured to reduce interference arising from clocking frequencies.

FFTs and IFFTs are widely used in many applications. One example of such an application is in an OFDM (orthogonal frequency division multiplex) transceiver. OFDM is a data transmission scheme in which data is divided between a series of carriers. Each carrier has a different frequency, and the data to be borne on that carrier is modulated on to a signal of the respective frequency. Accordingly, an OFDM transmitter must generate a signal for transmission that represents the aggregate of a series of signals of the different carrier frequencies, each modulated by a data stream. An OFDM receiver must recover from a received aggregate signal the modulation weightings that were applied by the transmitter to the components of that signal at the frequencies of the individual carriers. The computation to be performed by the transmitter is computationally equivalent to an IFFT, and the computation to be performed by the receiver is computationally equivalent to an FFT.

That equivalence is commonly exploited in the design of OFDM transceivers. FIG. 1 is a simplified schematic diagram of an OFDM transceiver. The transceiver comprises an antenna 1 which is connected to a receive chain 2 and a transmit chain 3. A baseband section 4 is connected to the transmit and receive chains and performs baseband processing. The transmit chain comprises a pre-processing unit 5 which receives data for transmission from the baseband section and performs operations such as encoding, interleaving and constellation mapping (symbol generation) on it, as appropriate for the protocols of the system in which it is to be used. The output of the pre-processing unit passes to an IFFT unit 6 which performs an IFFT in the digital domain on the data output from the pre-processing unit. The symbols provided to the IFFT represent the weightings to be applied in the output to signals of a respective carrier frequency. The output of the IFFT represents the aggregate of those weighted carrier signals. The output of the IFFT is converted to analogue by digital-to-analogue converter (DAC) 7 and then mixed in mixer 8 with a signal from a local oscillator 9 to form a signal for transmission. The receive chain comprises a pre-select filter 10 and an amplifier 11, the output of which passes to I and Q mixers 12, 13. The mixers mix the received signal with I and Q signals from local oscillator 14. The output of the mixers 12, 13 is filtered in filters 15, 16 and converted to digital by analogue-to-digital converters (ADCs) 17, 18. The outputs of the ADCs populate the bins of an FFT unit 19 which determines the weighting associated with each carrier during each sampling period. Those weightings represent a stream of output data which is passed to a symbol estimator 20 which estimates the symbols represented in the output data and passes them to the baseband section 4.

Specifications have been designed for UWB (ultra wideband) systems that achieve wide spectrum coverage through the use of OFDM with numerous carrier frequencies. An example is the Multiband OFDM Physical layer specification, published by the Multiband OFDM Alliance (MBOA) Special Interest Group (SIG). In such a system there are 128 carrier frequencies and a bandwidth per channel of 528 MHz. In such a system the most natural frequency at which to clock the FFT and the IFFT is 528 MHz since this is the bandwidth of a symbol. Nyquist theory dictates that the minimum sampling frequency in such a system is either 2*528 M samples per second if real samples are used, or 1*528 M (complex) samples per second if complex samples are used. The MBOA standard then calls for this bandwidth to be split into 128 equal bins, which is suited to a 128 point FFT, resulting in each bin having a bandwidth of 528/128 =4.125MHz. It should be noted that any processing that gives 128 bins, each with this bandwidth, can be used - such as a filterbank of 128 filters - but the FFT is a remarkably efficient way of performing the required processing. Normally the length of the FFT, i.e. the number of input bins that it processes, is chosen to be a power of 2 since that leads to an efficient design in terms of gate count. In a conventional FFT unit for decomposing a received OFDM signal the FFT has one input bin (and hence one output signal) for each of the carrier frequencies that are used in the OFDM protocol in question. As indicated above, the length of the FFT is conveniently 128 in the case of an FFT for decoding in a standard UWB system of this type.

It is becoming increasingly common for single devices or even single integrated circuits to be capable of supporting more than one communication protocol. It can be anticipated that UWB facilities will be incorporated into various devices, including mobile phones. One mobile phone system is the WCDMA/3G system. This uses the frequencies 1920 to 1980 MHz for uplink signalling and 2110 to 2170 MHz for downlink signalling. This could lead to problems if a WCDMA user equipment unit, which is intended to receive downlink signals in the 2110 to 2170 MHz frequency range, were to be co-located with a UWB transceiver using a clock frequency of 528 MHz for its ADC and DAC. The fourth harmonic of the 528 MHz clock signal would lie at 2112 MHz, which is within the WCDMA downlink frequency range. There is thus potential for the fourth harmonic of the UWB clock signal to interfere with the reception of WCDMA downlink signals. This could significantly degrade the quality of reception of WCDMA downlink signals.

There is therefore a need for a convenient mechanism for operating a UWB transmitter and/or receiver in such a way that its capacity to interfere with the reception or transmission of WCDMA downlink signals is reduced.

According to the present invention there is provided a receiver for processing a signal in which data symbols are each represented by the energy at each of a plurality of carrier frequencies, the receiver comprising: an analogue to digital converter for periodically sampling the signal and generating a corresponding digital sample; a Fourier transform unit having a plurality of input bins for receiving samples generated by the analogue to digital converter and being arranged to, in dependence on the samples, generate outputs representing the energy in the signal during a sample period at each of a plurality of frequencies including the carrier frequencies; and a symbol estimator for estimating a symbol present in the signal during a sample period in dependence on the outputs of the Fourier transform unit; wherein the number of the input bins is greater than the total number of carrier frequencies and during each sample period the number of the outputs in dependence on which the symbol estimator performs symbol estimation is less than the number of input bins.

According to a second aspect of the present invention there is provided a transmitter for generating a signal in which data symbols are each represented by the energy at each of a plurality of carrier frequencies, the transmitter comprising: a symbol generator for generating energy data each representing the energy of a desired output signal at a corresponding carrier frequency; an inverse Fourier transform unit having a plurality of input bins each for receiving a corresponding one of the energy data, and being arranged to, in dependence on the content of the energy data generate outputs representing time-spaced values of a signal having the energy at each of the plurality of carrier frequencies indicated by the energy data; and a digital to analogue converter for receiving the outputs and processing them to generate a corresponding analogue signal; wherein the number of the input bins is greater than the total number of carrier frequencies and during each sample period the number of the energy data generated by the symbol generator is less than the number of input bins.

The Fourier transform unit may be a fast Fourier transform unit.

The number of outputs generated by the Fourier transform unit during a sample period may be equal to the number of input bins. Some of the outputs may be discarded. The outputs that are discarded may be outputs that represent the energy in the signal during a sample period at frequencies that are not carrier frequencies.

The signal may be an orthogonal frequency division multiplex (OFDM) signal.

The signal may be formed by steps including downconversion of a received signal, such as a received radio signal.

The number of bins may be a number that is not 2 to the power of an integer.

The ratio of the number of bins to the total number of frequency channels may be a:b where a and b are integers and a is indivisible by b. The ratio of the number of bins to the total number of frequency channels may be 9:8.

The transmitter and the receiver may be a for signals of an ultrawideband standard. The period at which the analogue to digital converter samples the signal may correspond to a frequency that has insignificant harmonics in the frequency band from 2110 to 2170 MHz.

The transmitter may comprise an upconverter for upconverting the said signal.

The present invention will now be described by way of example with reference to the accompanying drawings.

Figure 1:
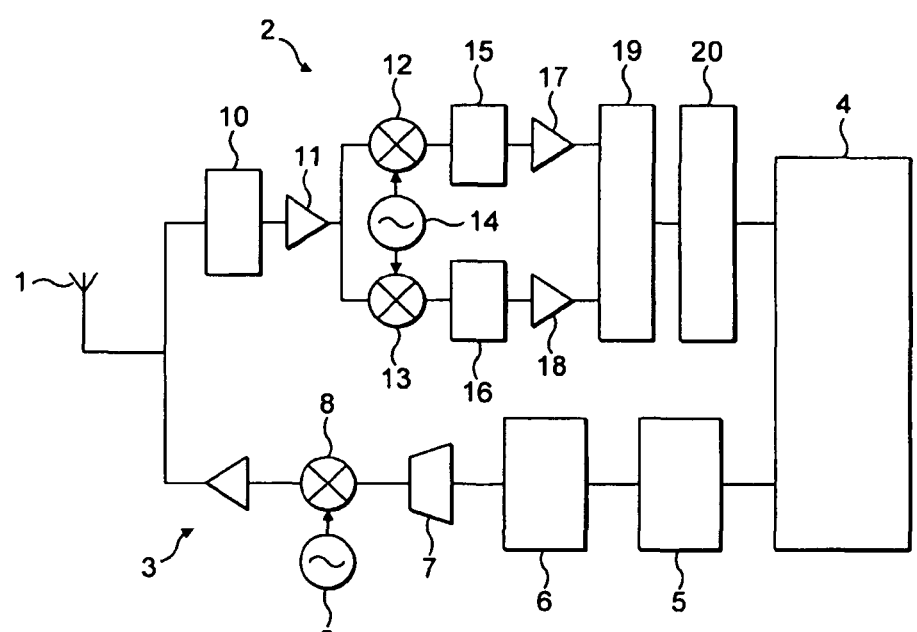
FIG. 1 is a simplified schematic diagram of a UWB transceiver.
Figure 2:
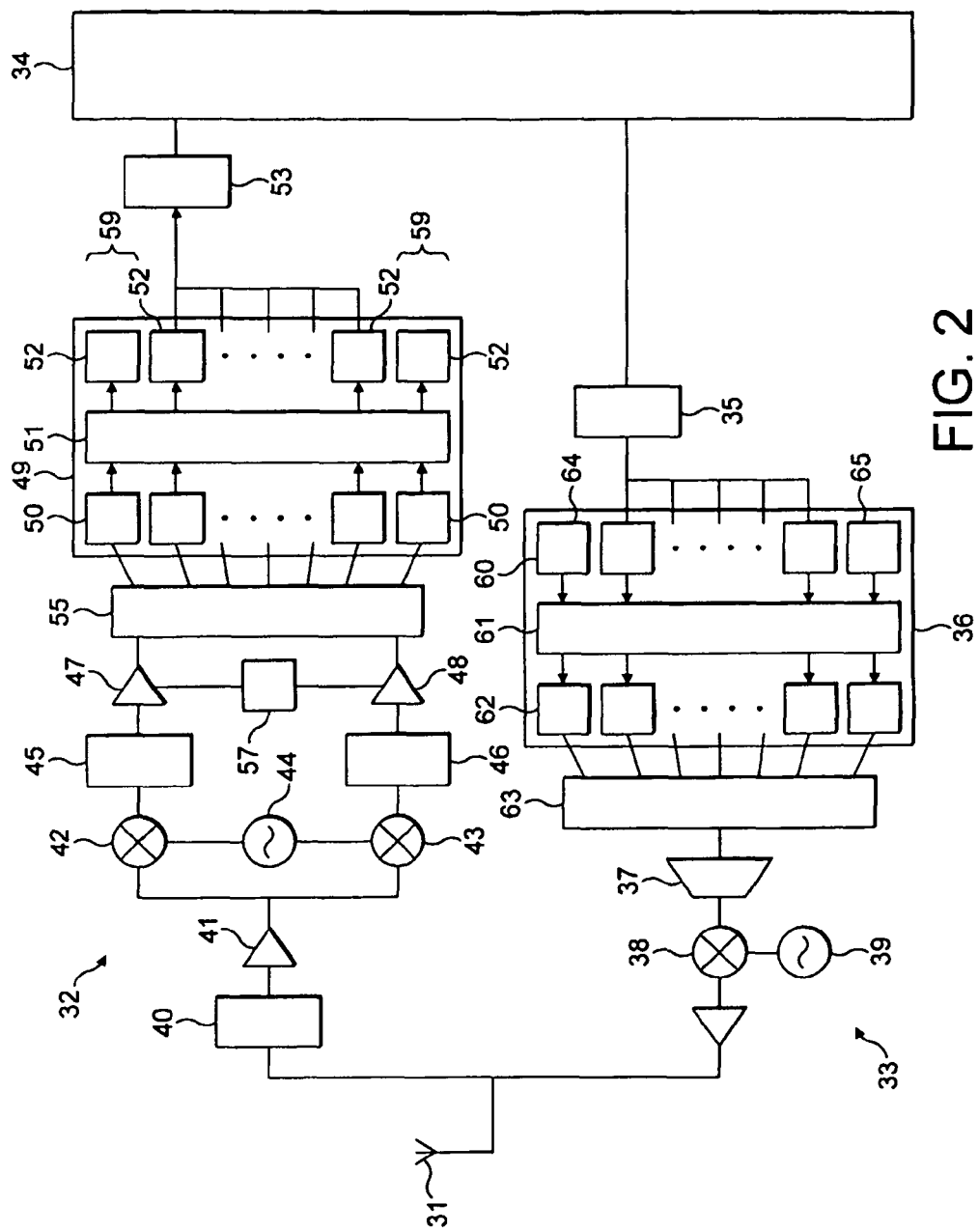
FIG. 2 is a simplified schematic diagram of another UWB transceiver.

The transceiver of FIG. 2 is broadly similar to that of FIG. 1. However, in the transceiver of FIG. 2 the length of the FFT is different. In the transceiver of FIG. 2 the length of the FFT has been selected such that it can conveniently be clocked by a clock that does not have a significant harmonic at or around 2112 MHz.

The basic architecture of the transceiver of FIG. 2 is similar to that of FIG. 1. It comprises an antenna 31 which is connected to a receive chain 32 and a transmit chain 33. A baseband section 34 is connected to the transmit and receive chains and performs baseband processing. The transmit chain comprises a pre-processing unit 35 which receives data for transmission from the baseband section and performs operations such as encoding, interleaving and constellation mapping (symbol generation) on it, as appropriate for the protocols of the system in which it is to be used. The output of the pre-processing unit passes to an IFFT unit 36 which performs an IFFT in the digital domain on the data output from the pre-processing unit. The symbols provided to the IFFT represent the weightings to be applied in the output to signals of a respective carrier frequency. The output of the IFFT represents the aggregate of those weighted carrier signals. The output of the IFFT is converted to analogue by digital-to-analogue converter (DAC) 37 and then mixed in mixer 38 with a signal from a local oscillator 39 to form a signal for amplification and then transmission. The receive chain comprises a pre-select filter 40 and an amplifier 41, the output of which passes to I and Q mixers 42, 43. The mixers mix the received signal with I and Q signals from local oscillator 44. The output of the mixers 42, 43 is filtered in filters 45, 46 and converted to digital by analogue-to-digital converters (ADCs) 47, 48. The outputs of the ADCs populate the bins of an FFT unit 49 which determines the weighting associated with each carrier during each sampling period. Those weightings represent a stream of output data which is passed to a symbol estimator 53 which estimates the symbols represented in the output data and passes them to the baseband section 4.

The FFT unit 49 comprises a series of data stores 50 known as bins. The bins act as inputs to an FFT processing block 51, which produces a series of outputs at 52 dependent on the inputs. The outputs are passed to a symbol detector 53 which detects symbols in the received data. The operation of the FFT processing block may take any suitable form in software and/or hardware.

Taking the number of bins 50 and outputs 52 of the FFT to be n, the operation of the FFT unit 49 is as follows. During the period corresponding to the symbol period of the signal being received the received signal is sampled by each of the ADCs 47, 48 n times. Data from the ADCs passes to a demultiplexer 55 which sends the samples to the appropriate one of the bins 50. The first pair of samples is loaded into the first of the n bins 50, the second pair of samples into the second bin, and so on until all the samples from one symbol period have been loaded. Then the outputs of the FFT unit are taken as a stream of data from each of the outputs 50 in turn. That stream of data is passed to the symbol detector 53.

The sampling of the received signals by the ADCs is triggered by a clock signal generated by a clock 57. That clock may be specific to the ADCs or it may be derived from another clock or could be shared with other functions of the transceiver. It could be generated in the transceiver or received from an external source. The clock 57 could comprise an oscillator or could simply comprise means such as a frequency divider or multiplier for deriving the clock signal from an applied signal.

The frequency of the clock is set to be equal to the symbol period of the data to be received divided by the number of input bins 50 in the FFT unit 49. In practical systems each symbol period may be separated by a guard interval or a cyclic prefix. Samples taken by the ADCs during guard intervals, cyclic prefixes or the like are discarded by the demultiplexer 55.

In a conventional FFT unit for decomposing a received OFDM signal the FFT has one input bin (and hence one output signal) for each of the carrier frequencies that are used in the OFDM protocol in question. In the system of FIG. 2 the FFT unit has additional bins and hence output signals beyond those that correspond to the carrier signals. The output signals corresponding to frequencies at which there is no carrier are discarded and not passed to the symbol estimator. This allows the frequency at which the ADC is clocked to be adjusted to avoid it interfering with other signals.

The OFDM signal as presented to the FFT is composed of signals at a number of carrier frequencies. The energy at each of those frequencies during a symbol period is used to estimate what symbol was transmitted during that period. The FFT unit 49 has outputs that correspond to each of those frequencies, representing the energy at that frequency in the signal for the appropriate symbol period. Note that since in this example the received signal is mixed with a local oscillator signal in the mixers 42, 43 the frequencies about which the FFT unit provides data will be offset by the local oscillator frequency from the corresponding carrier frequencies in the signal that is transmitted over the channel. In the present system the FFT has more input bins and output signals than there are frequency channels in the incoming OFDM signal. Those additional output signals may represent higher or lower frequencies than the frequency channels in the incoming OFDM signal. The additional outputs represent the energy in the incoming signal at frequencies that do not correspond to any of the OFDM channels. Those channels (which are illustrated at 59) are not passed to the symbol estimator 53.

Since the clock frequency is related to the number of FFT bins and outputs, the number of additional bins/outputs can be selected to avoid the clock causing interference. In order for it to be effective to reduce interference in this way it is preferred that the ratio between the total number of bins of the FFT unit and the number of frequency channels is not an integer factor; otherwise a simple harmonic of the new clock frequency would still lie on the interfering frequency. Most preferably the ratio between the total number of bins of the FFT unit and the number of frequency channels is a rational fraction such as 9:8.

It is relatively efficient to build FFT units that have a number of bins that is a power of two. For that reason, an FFT unit designed according to the principles described above would have a number of bins that is not a factor of two. Also, where circuit area is a consideration, the number of FFT bins should be chosen taking into account the area of the resulting FFT. The area of the resulting FFT depends on a number of factors, including the number of bins, whether the number of bins is a power of 2 and the type of processing that is used. For a radix 2 FFT (i.e. an FFT whose number of bins is a power of 2, such as 128), the processing that is required is approximately $7*2^7$ operations. In a 128 bin system of the type described above the typically has to process one point per clock cycle, so 7 operations would need to be performed in each clock cycle. These operations can be pipelined for efficiency into a set of operations each of which, in one implementation, involves receiving two complex numbers and outputting the complex number sum and difference of those two inputs. Such a block is known as a butterfly. For a mixed radix FFT the length is, the product of mixed radices. This can also be broken down into pipelined blocks, some of which may be 2×2 butterfly blocks of the type described above, but some of which involve additional processing and/or additional storage and thus additional area.

Similar principles to those described above can be used to manipulate the clock frequency of the DAC in the transmit chain. The number of input bins in the IFFT unit can be selected so that the IFFT unit generates more outputs than there are OFDM channels. As a result, the DAC can be clocked at a higher frequency than would normally be the case.

The IFFT unit 36 comprises a number of input bins 60 and processing means 61 that generates an equal number of outputs 62 representing the level of the output signal at equally spaced time intervals. The outputs pass to a multiplexer 63 which passes them one-by-one to the DAC. The DAC is clocked with a frequency that is equal to the number of outputs divided by the symbol period (ignoring guard intervals, cyclic prefixes or the like). In a conventional implementation the IFFT unit would have an equal number of input bins to the number of OFDM channels. In the present design it has additional bins. The bins that correspond to the frequencies of OFDM channels are populated as normal by the baseband section 34. The remaining bins (illustrated at 64, 65) are set to zero to indicate that there is no energy at the corresponding frequencies.

Similar considerations apply to the selection of the frequency for clocking the DAC and the number of bins in the IFFT unit as apply to the corresponding values in the receive chain. Conveniently the FFT unit and the IFFT unit have the same number of bins and the same clock frequency is used for the ADC(s) as for the DAC(s). When the same clock frequency and number of bins is used in transmitter and receiver of a transceiver, or generally in a collocated transmitter and receiver interference arising from leakage of the sample rate through the converters (DACs and ADCs) can be significantly reduced. As stated above, the transmit IFFT could be longer than the receive FFT (e.g. the transmit IFFT could be 135, 140 or 144 points long) and the extra bins of the transmitter could be driven with 0. The use of such additional bins, set to zero on the DACs for transmit, and discarded on receive—also helps to ease some analogue filtering.

An alternative to the use of additional FFT bins is to use a digital interpolating filter between the ADC and the FFT, allowing the ADC to sample at an increased rate whilst a lower number of samples is passed to the FFT. An alternative to the use of additional IFFT bins is to use a digital extrapolating filter between the IFFT and the DAC, allowing the DAC to operate at an increased rate whilst a lower number of samples are generated by the FFT.

The digital clock may need to be locked to the phase of the signal to be received. This can be done in a number of ways. For example, a delay-locked-loop and a multiplexer could be used, or a polyphase filter with an appropriate number of phases, or an n-times oscillator and a divide-by-n circuit. Alternatively, additional phases could be compensated for by using frequency domain correction.

The FFT and the IFFT may implement conventional FFT and IFFT algorithms. Instead of FFT and IFFT algorithms other Fourier transform and inverse Fourier transform algorithms may be used.

A receiver, transmitter or transceiver as described above may conveniently be implemented on a single integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An ultra-wideband receiver for processing a signal in which data symbols are each represented by the energy at each of a plurality of carrier frequencies, the receiver comprising:

an analogue to digital converter for periodically sampling the signal and generating a corresponding digital sample, the analogue to digital converter being triggered by a clock;

a Fourier transform unit having a plurality of input bins for receiving samples generated by the analogue to digital converter and being arranged to, in dependence on the samples, generate outputs representing the energy in the signal during a sample period at each of a plurality of frequencies including the carrier frequencies; and a symbol estimator for estimating a symbol present in the signal during a sample period in dependence on the outputs of the Fourier transform unit;

wherein the number of the input bins is greater than the total number of carrier frequencies and during each sample period the number of the outputs in dependence on which the symbol estimator performs symbol estimation is less than the number of input bins such as to avoid the clock interfering with the reception or transmission of WCDMA downlink signals.

2. A receiver as claimed in claim 1, wherein the Fourier transform unit is a fast Fourier transform unit.

3. A receiver as claimed in claim 1, wherein the number of outputs generated by the Fourier transform unit during a sample period is equal to the number of input bins.

4. A receiver as claimed in claim 3, wherein those outputs that represent the energy in the signal during a sample period at frequencies that are not carrier frequencies are discarded.

5. A receiver as claimed in claim 1, wherein the signal is an orthogonal frequency division multiplex signal.

6. A receiver as claimed in claim 1, wherein the said signal is formed by steps including down-conversion of a received signal.

7. A receiver as claimed in claim 1, wherein the number of bins is a number that is not 2 to the power of an integer.

8. A receiver as claimed in claim 1, wherein the ratio of the number of bins to the total number of frequency channels is not an integer factor.

9. A receiver as claimed in claim 8, wherein the ratio of the number of bins to the total number of frequency channels is 9:8.

10. A receiver as claimed in claim 1, wherein the period at which the analogue to digital converter samples the signal corresponds to a frequency that has no harmonics in the frequency band from 2110 to 2170 MHz.

11. An ultra-wideband transmitter for generating a signal in which data symbols are each represented by the energy at each of a plurality of carrier frequencies, the transmitter comprising:

a symbol generator for generating energy data each representing the energy of a desired output signal at a corresponding carrier frequency;

an inverse Fourier transform unit having a plurality of input bins each for receiving a corresponding one of the energy data, and being arranged to, in dependence on the content of the energy data generate outputs representing time-spaced values of a signal having the energy at each of the plurality of carrier frequencies indicated by the energy data; and a digital to analogue converter for receiving the outputs and processing them to generate a corresponding analogue signal, the digital to analogue converter being triggered by a clock having a frequency substantially equal to a symbol period of the data symbols divided by the number of input bins;

wherein the number of the input bins is greater than the total number of carrier frequencies and during each symbol period the number of the energy data generated by the symbol generator is less than the number of input bins such as to avoid the clock interfering with the reception or transmission of WCDMA downlink signals.

12. A transmitter as claimed in claim 11, wherein the inverse Fourier transform unit is an inverse fast Fourier transform unit.

13. A transmitter as claimed in claim 11, wherein the inverse Fourier transform unit generates samples, and the number of samples generated by the inverse Fourier transform unit during a sample period is equal to the number of input bins.

14. A transmitter as claimed in claim 13, wherein those outputs that represent the energy in the signal during a sample period at frequencies that are not carrier frequencies are set to zero.

15. A transmitter as claimed in claim 11, wherein the signal is an orthogonal frequency division multiplex signal.

16. A transmitter as claimed in claim 11, further comprising an up-converter for up-converting the said signal.

17. A transmitter as claimed in claim 11, wherein the ratio of the number of bins to the total number of frequency channels is not an integer factor.

18. A transmitter as claimed in claim 17, wherein the ratio of the number of bins to the total number of frequency channels is 9:8.

19. A transmitter as claimed in claim 11, wherein the period at which the digital to analogue converter processes the outputs corresponds to a frequency that has no harmonics in the frequency band from 2110 to 2170 MHz.

* * * * *